(12) United States Patent
Wu et al.

(10) Patent No.: US 10,321,696 B2
(45) Date of Patent: *Jun. 18, 2019

(54) VEGETABLE PRESERVATION AND GROWING CASE AND VEGETABLE PRESERVATION METHOD

(71) Applicants: HAIER GROUP CORPORATION, Qingdao, Shandong (CN); QINGDAO HAIGAO DESIGN & MANUFACTURING CO., LTD, Qingdao, Shandong (CN)

(72) Inventors: Jian Wu, Shandong (CN); Shu Zhou, Shandong (CN); Zhaojun Fei, Shandong (CN); Haibo Liu, Shandong (CN)

(73) Assignees: HAIER GROUP CORPORATION, Qingdao, Shandong (CN); QINGDAO HAIGAO DESIGN & MANUFACTURING CO., LTD, Qingdao, Shandong (CN)

(*) Notice: Subject to any disclaimer, the term of this patent is extended or adjusted under 35 U.S.C. 154(b) by 565 days.

This patent is subject to a terminal disclaimer.

(21) Appl. No.: 14/894,781

(22) PCT Filed: Mar. 31, 2014

(86) PCT No.: PCT/CN2014/074379
§ 371 (c)(1),
(2) Date: Nov. 30, 2015

(87) PCT Pub. No.: WO2014/190800
PCT Pub. Date: Dec. 4, 2014

(65) Prior Publication Data
US 2016/0106115 A1     Apr. 21, 2016

(30) Foreign Application Priority Data

May 30, 2013   (CN) .......................... 2013 1 0209591
May 30, 2013   (CN) .......................... 2013 1 0209918

(51) Int. Cl.
| | | |
|---|---|---|
| A01G 31/06 | (2006.01) | |
| A23B 7/01 | (2006.01) | |
| A23B 7/158 | (2006.01) | |
| A01G 7/04 | (2006.01) | |

(Continued)

(52) U.S. Cl.
CPC .............. A23B 7/012 (2013.01); A01G 7/045 (2013.01); A01G 31/02 (2013.01); A01G 31/06 (2013.01);

(Continued)

(58) Field of Classification Search
CPC ......... A01G 31/00; A01G 31/02; A01G 31/06

(Continued)

(56) References Cited

U.S. PATENT DOCUMENTS

| | | | | |
|---|---|---|---|---|
| 2,928,211 A | * | 3/1960 | Martin .................. | A01G 31/06 47/60 |
| 3,458,951 A | * | 8/1969 | Martin .................. | A01G 31/06 239/524 |

(Continued)

FOREIGN PATENT DOCUMENTS

| | | |
|---|---|---|
| CN | 2423239 Y | 3/2001 |
| CN | 1552180 A | 12/2004 |

(Continued)

OTHER PUBLICATIONS

State Intellectual Property Office of the P.R. China (ISR/CN), "International Search Report for PCT/CN2014/074379", China, dated Sep. 3, 2014.

*Primary Examiner* — David J Parsley
(74) *Attorney, Agent, or Firm* — Tim Tingkang Xia, Esq.; Locke Lord LLP (57) ABSTRACT

A ecological vegetable preservation method and an ecological vegetable preservation and growing case. The method includes circularly supplying a nutrient solution to a vegetable in a thermal insulation case body, and regulating (Continued)

temperature, humidity and/or illumination in the thermal insulation case body, so that the vegetable in the thermal insulation case body stays in a growth-retarded state or a slow growth state. Application of the present method and ecological vegetable preservation and growing case allows the growth state of the vegetable to be controlled, thus ensuring to the greatest extent the freshness of the vegetable.

8 Claims, 4 Drawing Sheets

(51) Int. Cl.
*A01G 31/02* (2006.01)
*A01G 31/00* (2018.01)

(52) U.S. Cl.
CPC ........ *A23B 7/158* (2013.01); *A01G 2031/006* (2013.01); *Y02P 60/216* (2015.11)

(58) Field of Classification Search
USPC ................. 47/48.5, 59 R, 60, 62 R
See application file for complete search history.

(56) References Cited

U.S. PATENT DOCUMENTS

| | | | | | |
|---|---|---|---|---|---|
| 4,255,897 | A | * | 3/1981 | Ruthner | A01G 7/045 47/65 |
| 4,332,105 | A | * | 6/1982 | Nir | A01G 31/02 137/563 |
| 4,869,019 | A | * | 9/1989 | Ehrlich | A01G 31/06 47/59 R |
| 4,953,363 | A | * | 9/1990 | Primozic | A47F 3/0443 312/116 |
| 5,073,401 | A | * | 12/1991 | Mohr | A01G 31/042 426/138 |
| 5,283,974 | A | * | 2/1994 | Graf, Jr. | A01G 9/00 47/60 |
| 8,234,812 | B1 | * | 8/2012 | Colless | A01G 9/16 47/61 |
| 8,726,568 | B2 | * | 5/2014 | Wilson | A01G 31/00 47/62 R |
| 8,910,419 | B1 | * | 12/2014 | Oberst | A01G 31/06 47/60 |
| 8,915,015 | B1 | * | 12/2014 | Augspurger | A01G 9/14 47/17 |
| 9,888,635 | B2 | * | 2/2018 | Wu | A01G 31/06 |
| 2013/0014435 | A1 | * | 1/2013 | Hansen | A01G 31/02 47/60 |

FOREIGN PATENT DOCUMENTS

| | | |
|---|---|---|
| CN | 101300958 A | 11/2008 |
| CN | 102180312 A | 9/2011 |
| CN | 202285745 A | 7/2012 |
| CN | 102696473 A | 10/2012 |
| CN | 102885492 A | 1/2013 |

* cited by examiner

VEGETABLE PRESERVATION AND GROWING CASE AND VEGETABLE PRESERVATION METHOD

CROSS-REFERENCE TO RELATED APPLICATIONS

This application claims priority to Chinese Patent Application Nos. 201310209918.2, and 20131020959.9, both filed May 30, 2013 in the State Intellectual Property Office of P.R. China, which is incorporated herein by reference in their entireties.

FIELD OF THE INVENTION

The present invention relates to a vegetable preservation technology, and in particular, to a vegetable preservation and growing case and vegetable preservation method.

BACKGROUND OF THE INVENTION

Modern people, especially office workers living in big cities, are busy with their work and spend a lot of time on commuting. Nevertheless, to ensure nutrition and health, a lot of people still choose to cook at home. However, if people need to buy food every day, it definitely wastes some of precious spare time. Therefore, many people choose to buy vegetables that can sustain for several days or even a week at one time. In this case, how to preserve vegetables becomes a problem.

In modern life, people use refrigerator cold storage technology to implement preservation of vegetables. Although refrigerators solve the issue of vegetable preservation in some degree, a common refrigerator can only regulate temperature, but cannot ensure the freshness and taste of vegetables after the vegetables are stored for a period of time; a common refrigerator achieves only a function of delaying putrefaction of foods such as vegetables, and the putrefaction can be delayed by only a very short time. As living requirements of people increase continuously, people want such a product that can keep vegetables still in a growth-retarded state or a slow growth state after being picked and sold, and ensure that vegetables can be preserved for a long time.

SUMMARY OF THE INVENTION

A brief summary of the present invention is provided below, so as to provide basic comprehension about some aspects of the present invention. It should be understood that, this summary is not an exhaustive summary about the present invention. It is neither intended to define key or essential parts of the present invention, nor intended to limit the scope of the present invention. It is merely intended to provide some concepts in a simplified form, so as to serve as a prelude of more detailed descriptions discussed subsequently.

The present invention provides a vegetable preservation and growing case, which can preserve vegetables for a long time, where the box includes:
a thermal insulation case body;
an electric control component, configured to perform electric control on the thermal insulation case body;
a control component, configured to regulate temperature, humidity and/or illumination in the thermal insulation case body; and
a pipeline component, configured to circularly supply a nutrient solution into the thermal insulation case body,
where at least one vegetable carrier for vegetable growing or preservation is disposed in the thermal insulation case body.

In the technical solution of the present invention, a vegetable carrier is disposed in a thermal insulation case body, a pipeline component is used to circulate a nutrient solution inside the box, and an electric control component can regulate temperature, humidity and/or illumination in the thermal insulation case body to fall in a range required for vegetable growth, so that a vegetable on the vegetable carrier can be nourished in a required growth environment, and even after being picked and sold, the vegetable can still stay in a growth-retarded state or a slow growth state, and therefore can be preserved for a long time.

The present invention further provides a vegetable preservation method, which can be used to improve the freshness of vegetables and extend a preservation time.

According to one aspect of the present invention, a vegetable preservation method includes: circularly supplying a nutrient solution to a vegetable in a thermal insulation case body, and regulating temperature, humidity and/or illumination in the thermal insulation case body, so that the vegetable in the thermal insulation case body stays in a growth-retarded state or a slow growth state.

According to the vegetable preservation method of the present invention, a vegetable is placed in a thermal insulation case body, a nutrient solution is circularly supplied to the vegetable, and temperature, humidity and/or illumination in the thermal insulation case body is regulated, so that the vegetable in the thermal insulation case body stays in a growth-retarded state or a slow growth state, thereby ensuring the freshness to a maximum extent, and extending a preservation time.

DETAILED DESCRIPTION OF THE INVENTION

Embodiments of the present invention are described below with reference to the accompanying drawings. Elements or features described in one figure or one implementation manner of the present invention may be combined with elements and features shown in one or more other figures or implementation manners. It should be noted that, for the purpose of clarity, representations and descriptions of parts and processing that are irrelevant to the present invention and known to those of ordinary skill in the art are omitted in the accompanying drawings and illustration.

Figure 1:
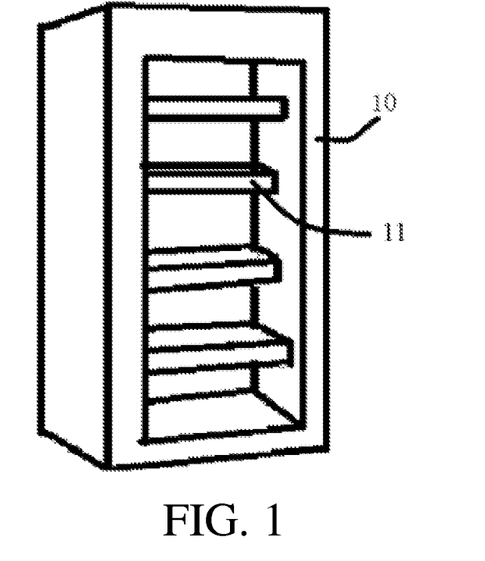
FIG. 1 is a schematic structural diagram of a vegetable preservation and growing case according to an embodiment of the present invention.
Figure 2:
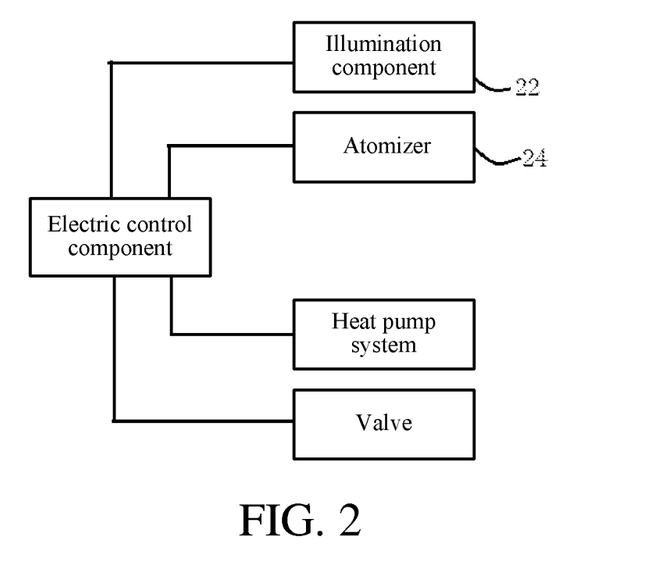
FIG. 2 is a schematic diagram of a connection between an electric control component and a control component in a vegetable preservation and growing case according to the present invention.

FIG. 1 is a schematic structural diagram of a vegetable preservation and growing case according to an embodiment of the present invention. FIG. 2 is a schematic diagram of a connection between an electric control component and a control component in a vegetable preservation and growing case according to the present invention. As shown in FIG. 1 and FIG. 2, the vegetable preservation and growing case includes:

a thermal insulation case body 10, an electric control component configured to perform electric control on the thermal insulation case body 10, a control component configured to regulate temperature, humidity and/or illumination in the thermal insulation case body 10, and a pipeline component configured to circularly supply a nutrient solution into the thermal insulation case body 10.

At least one vegetable carrier 11 is disposed in the thermal insulation case body 10, where the vegetable carrier 11 is used for vegetable growing or preservation. The vegetable carrier 11 is disposed in the thermal insulation case body 10, the pipeline component is used to circulate the nutrient solution in the box, and the temperature, humidity and/or illumination in the thermal insulation case body 10 is regulated to fall in a range required by vegetable growth, so that a vegetable on the vegetable carrier 11 can be nourished in a required growth environment, and even after being picked, the vegetable can still stay in a growth-retarded state or a slow growth state, and therefore can be preserved for a long time.

The electric control component and the pipeline component may be specifically disposed on a housing of the thermal insulation case body 10. The vegetable carrier 11 may be in communication with the pipeline component by means of a water connection.

Optionally, the control component includes an illumination component 22 that is disposed in the thermal insulation case body 10 and configured to illuminate each vegetable carrier 11 from above. The electric control component is configured to control a state of the illumination component 22. For example, a light guide plate electrically connected to the electric control component may be disposed above each vegetable carrier 11, and by using the electric control component, light intensity of the light guide plate can be controlled within a light intensity range suitable for growth of a vegetable on the vegetable carrier 11.

The illumination component illuminates the vegetable carrier 11 from above, and the electric control component controls the state of the illumination component, which not only can ensure the uniformity of illumination, but also can perform regulation according to an actual requirement. A required illumination environment can be provided for the vegetable on the vegetable carrier 11, to facilitate growth or preservation of the vegetable.

Specifically, multiple vegetable carriers 11 may be disposed in the thermal insulation case body 10 of the vegetable preservation and growing case of the present invention, and the multiple vegetable carriers 11 are disposed in parallel at intervals from top to bottom. In this manner, different types of vegetables can be placed on different vegetable carriers 11, so that a user can pick and place vegetables conveniently, and moreover, it can be implemented that different areas have different environments, which is beneficial to growth or preservation control for different types of vegetables.

Further, the bottom of an upper vegetable carrier 11 is provided with the illumination component 22 for illuminating a lower vegetable carrier 11, that is, an illumination component 22 disposed at the bottom of any vegetable carrier 11 can be configured to illuminate a vegetable carrier 11 below, so that the vegetable carrier 11 is illuminated from above. By using this manner, space can be saved, the structure is simple, and wiring is convenient.

Further, an illumination component for illuminating a top-layer vegetable carrier 11 may be disposed at the top of an internal space of the thermal insulation case body 10.

Optionally, each vegetable carrier 11 is disposed in the thermal insulation case body 10 in a pluggable manner, and is electrically connected to the electric control component in a pluggable manner When a particular vegetable carrier 11 is pulled out of the thermal insulation case body and is electrically disconnected from the electric control component, the electric control component may control, by means of a linkage, the water connection between the vegetable carrier 11 and the pipeline component to be cut off.

By using the foregoing manner, the vegetable carrier 11 can be conveniently drawn out of the thermal insulation case body 10, so that it is convenient to pick and place a vegetable and convenient to repair the vegetable carrier 11. In addition, each vegetable carrier 11 is enabled to work independently, so that after one vegetable carrier 11 is drawn out of the thermal insulation case body 10, normal operation of other vegetable carriers 11 is not affected; moreover, by means of linkage between an electric connection and a water connection, water leakage is avoided when the vegetable carrier 11 is taken out.

As a specific implementation manner, the pipeline component may be provided with a pluggable joint at a water connection position with each vegetable carrier 11, and a valve is disposed at the joint. When the electric control component is electrically disconnected from a particular vegetable carrier 11, the electric control component should immediately control a corresponding valve to be closed, to cut off a passage for the nutrient solution from the pipeline component to the vegetable carrier 11.

Optionally, each vegetable carrier 11 is provided with an atomizer 24 for atomizing the nutrient solution, and the electric control component is further configured to control a state of the atomizer 24.

Atomization of the nutrient solution facilitates nutrition absorption by the vegetable, so that the freshness can be retained more effectively. Moreover, by controlling the state of the atomizer 24, the electric control component can control humidity in the thermal insulation case body 10, and can further control a nutrition absorption degree of the vegetable, so that growth of the vegetable is in a controllable state.

The atomizer 24 may be specifically disposed at the center of the bottom of the vegetable carrier 11, which helps the vegetable to absorb nutrition uniformly from the root thereof.

Specifically, each vegetable carrier 11 includes a solution carrying box and a vegetable plate above the solution carrying box. The atomizer 24 may be disposed in the solution carrying box. The vegetable plate may be provided with multiple through holes in communication with the solution carrying box, so that roots of vegetables are inserted therein.

Further, in the solution carrying box, a zigzag flow passage is formed by protruding diversion partitions, and the vegetable plate is overhead the top of the flow passage. With the diversion partitions, a blind corner that stagnates the nutrient solution is not formed in the solution carrying box, so that the nutrient solution is circulated smoothly. Moreover, the vegetable plate is made to be overhead the top of the flow passage, which prevents the root of the vegetable from being immersed in the liquid and rotting, keeps the nutrient solution clean, and by regulating the atomized gas solubility, nutrients provided for the vegetable can be regulated, thereby making the growth state controllable.

Figure 3:
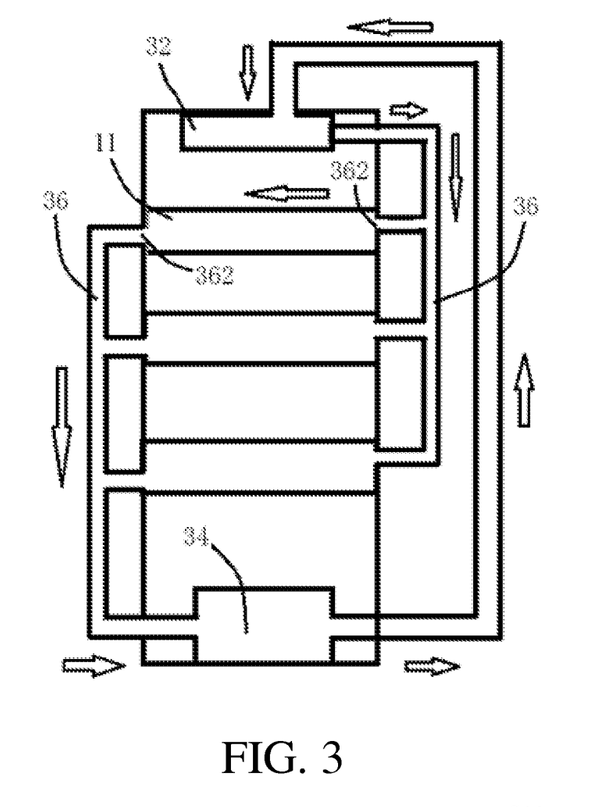
FIG. 3 is a schematic structural diagram of a pipeline component of a vegetable preservation and growing case according to the present invention.

FIG. 3 is a schematic structural diagram of a pipeline component of a vegetable preservation and growing case according to the present invention. Referring to FIG. 3, the foregoing pipeline component includes an upper container 32, a lower container 34 and a liquid circulation pipeline 36 that connects the upper container 32 and the lower container 34. The liquid circulation pipeline 36 is provided with at least two through holes 362 at intervals from top to bottom, and is in communication with at least two corresponding vegetable carriers 11 through the through holes 362. The upper container 32 may be disposed at the top of the thermal insulation case body 10, and the lower container 34 may be disposed at the bottom of the thermal insulation case body 10.

Therefore, the nutrient solution may be sequentially circulated among the upper container 32, the liquid circulation pipeline 36, each vegetable carrier 11, and the lower container 34 to form an independent circulation path. In this manner, each vegetable carrier 11 can operate independently, and does not affect normal operation of other vegetable carriers 11 when the water connection to the liquid circulation pipeline 36 is cut off. In addition, in this manner, after flowing from the lower container 34 to the upper container 32, the nutrient solution can be distributed to the vegetable carriers 11, thereby avoiding a problem that supply of the nutrient solution is not uniform because of different fluid pressures caused by different heights of the vegetable carriers 11.

Further, each vegetable carrier 11 includes a high-level liquid inlet and a low-level liquid outlet. The high-level liquid inlet is in communication with the upper container 32, and the low-level liquid outlet is in communication with the lower container 34. The nutrient solution in the upper container 32 flows through each vegetable carrier 11 and flows back to the lower container 34 under the action of gravity. The nutrient solution flows through each vegetable carrier 11 under the action of gravity, and therefore, the nutrient solution can be circulated at a low speed, so that a problem of an unsuitable vegetable growth environment due to an excessively high circulation speed is prevented without increasing costs. It can be known from the foregoing description that, the high-level liquid inlet and the low-level liquid outlet may be specifically provided on the solution carrying box.

Optionally, the liquid circulation pipeline 36 may be provided with a valve for controlling on/off of a water flow at each through hole 362, and the electric control component is further configured to control a state of each valve. By means of control over on/off of valves corresponding to the through holes 362, water connections between the liquid circulation pipeline 36 and the vegetable carriers 11 may be controlled to be turned on or off. Therefore, the water connection between the vegetable carrier 11 and the pipeline component can be controlled in a linked manner while control over the electric connection is implemented. For example, when the electric control component is disconnected from a circuit interface of one of the vegetable carriers 11, by closing a corresponding valve, a water connection to the vegetable carrier 11, where the water connection is liquid passage for supplying the nutrient solution to the vegetable carrier 11, that is, a through hole 362 in communication with the vegetable carrier 11, is also controlled to be cut off; when the vegetable carrier 11 is put into the thermal insulation case body 10 again, the circuit interface thereof is connected to the circuit component again, and by opening the valve, the through hole and the vegetable carrier 11 can be connected again.

Specifically, the liquid circulation pipeline 36 may be in communication with each vegetable carrier 11 by using pluggable joint. The vegetable carrier 11 and the liquid circulation pipeline 36 are connected by using pluggable joint, to facilitate repair, and moreover, it is easy to operate, and easy to correct a minor plugging mismatch by means of fine tuning. For example, the pluggable joints may be disposed at connection points between the through holes 362 of the liquid circulation pipeline 36 and the high-level liquid inlets of the vegetable carriers 11, or disposed at connection points between the through holes 362 of the liquid circulation pipeline 36 and the low-level liquid outlets of the vegetable carriers 11. The pluggable joint may specifically include a steel-core joint and a flexible material layer that is wrapped around the steel-core joint. When the vegetable carrier 11 is taken out of the thermal insulation case body 10, each joint is also unplugged from the liquid circulation pipeline 36, and when the vegetable carrier 11 is inserted into the thermal insulation case body 10, by using the flexible material at the periphery of the steel-core joint, when a minor mismatch occurs during a plugging process, a plugging position is fine-tuned, and therefore, the steel-core joint can match a joint on the pipeline component conveniently, so that the vegetable carrier 11 is inserted into the thermal insulation case body 10 more easily, and communication between the vegetable carrier 11 and the liquid circulation pipeline 36 by means of a water connection is implemented.

A flow guiding trough in communication with the lower container 34 may be provided at the periphery of the pluggable joint. In this way, when the water connection between the vegetable carrier 11 and the liquid circulation pipeline 36 is cut off, residue liquid in the pluggable joint may be guided to the lower container 34 by using the flow guiding trough, thereby preventing the security problem caused by water leakage.

The foregoing valve may be specifically disposed on the pluggable joint correspondingly. Moreover, the pluggable joint may be further provided with a protrusion at the periphery, and when water leakage occurs above the liquid circulation pipeline 36, leaked water may drop into the lower container 34 along the protrusion, and is prevented from dropping onto electrical parts on the joint, such as the valve for controlling on/off of the water connection.

Optionally, the control component further includes a heat pump system, and the electric control component is further configured to control a state of the heat pump system. A person skilled in the art should understand that, in one implementation manner, the heat pump system may include a compressor, a condenser, and an evaporator that are in communication with each other. The electric control component may be specifically connected to the compressor to control a state thereof, thereby controlling temperature of the thermal insulation case body 10, to maintain the temperature within a range suitable for slow growth of the vegetable.

Optionally, a temperature sensor for sending a temperature sensing signal to the electric control component and/or a humidity sensor for sending a humidity sensing signal to the electric control component and/or a concentration sensor for sending a concentration sensing signal to the electric control component is further disposed in the thermal insulation case body 10. The electric control component may specifically control the state of the heat pump system according to the temperature sensing signal, or control a state of a humidifier, such as the atomizer 24, in the thermal insulation case body 10 according to the humidity sensing signal. By setting the temperature sensor and the humidity sensor, control over the temperature and humidity is more precise, and an abnormality can be detected in time. The concentration sensor may be specifically disposed in the upper container 32, to avoid setting one concentration sensor for each vegetable carrier 11. By using the concentration sensing signal, it may be further determined whether the nutrient solution is sufficient.

Optionally, the housing of the thermal insulation case body 10 is provided with a control panel connected to the electric control component. The control panel may be specifically configured to display control parameters such as temperature, humidity, and illumination intensity, and may be further configured to receive a control instruction from a user, so that various control operations are performed by using the electric control component.

Figure 4:
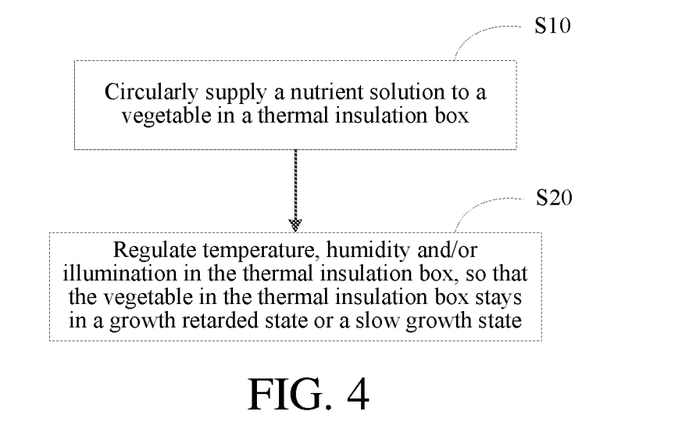
FIG. 4 is a flowchart of an implementation manner of a vegetable preservation method according to the present invention.

Refer to FIG. 4, which is a flowchart of an implementation manner of an ecological vegetable preservation method according to the present invention.

In this implementation manner, the vegetable preservation method includes:

S10: Circularly supply a nutrient solution to a vegetable in a thermal insulation case body.

The thermal insulation case body may be, for example, a refrigerator, a wine cabinet, or a similar box having an enclosed space.

With nutrients supplied thereto, a plant can better retain nutrients thereof, and stays in a fresh state continuously.

S20: Regulate temperature, humidity and/or illumination in the thermal insulation case body, so that the vegetable in the thermal insulation case body stays in a growth-retarded state or a slow growth state.

As a preferable manner, a method of closed loop control may be used to regulate the temperature and/or humidity in the thermal insulation case body. That is, a temperature and/or humidity sensor is used to capture a temperature and/or humidity signal in the thermal insulation case body and feed back the signal to a temperature and/or humidity controller. The temperature and/or humidity controller regulates the temperature and/or humidity in the box according to a difference between the current temperature and/or humidity in the thermal insulation case body and a target temperature and/or humidity, to achieve the target temperature and/or humidity.

By circularly supplying a nutrient solution to a vegetable in a thermal insulation case body and regulating temperature, humidity and/or illumination thereof, the vegetable in the box can stay in a slow growth state or a growth-retarded state, thereby ensuring the freshness of the vegetable as far as possible, and extending a preservation time.

Figure 5:
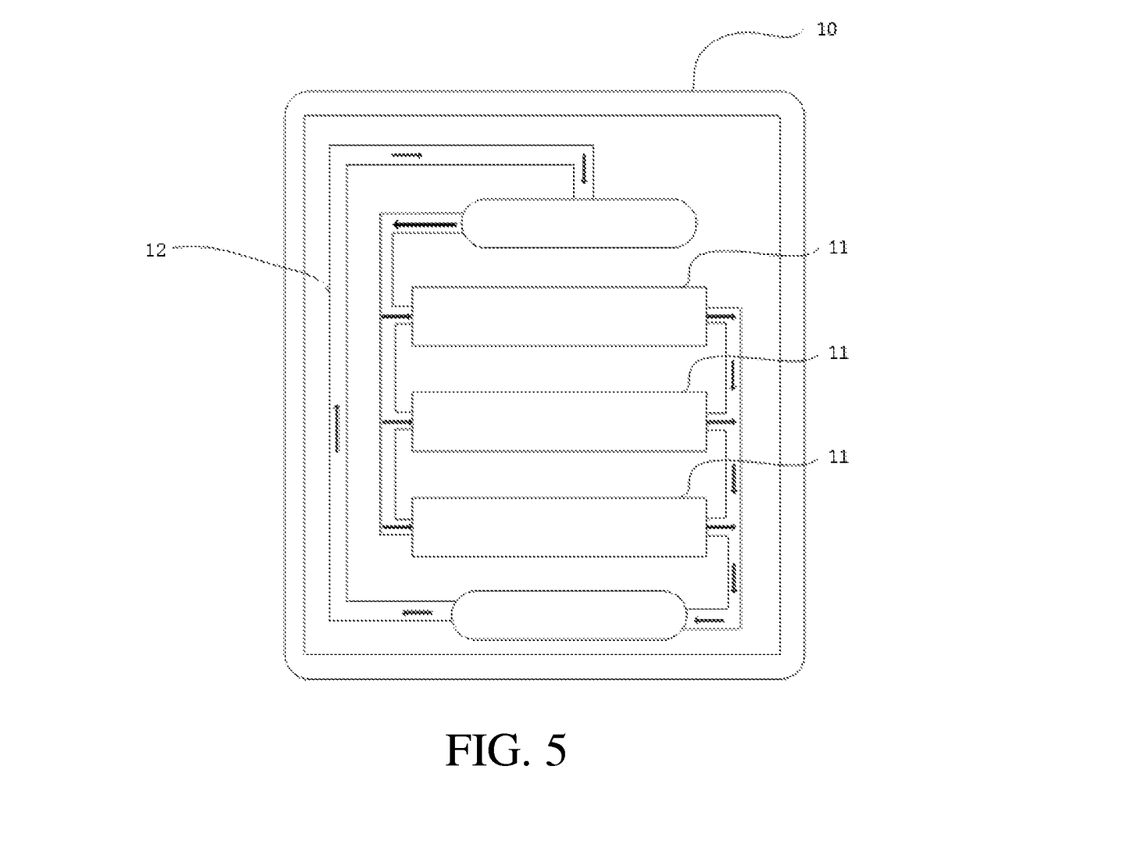
FIG. 5 is structure of a thermal insulation case body for implementing a vegetable preservation method according to an implementation manner of the present invention.

Refer to FIG. 5, which is a structure of a thermal insulation case body for implementing a vegetable preservation method according to an implementation manner of the present invention.

At least two, for example, three, vegetable carriers 11 may be disposed at intervals in parallel in a thermal insulation case body 10 along a vertical direction, to preserve vegetables, and the vegetable carriers 11 are connected to a nutrient solution circulation pipeline 12, where the nutrient solution circulation pipeline 12 is the pipeline component, for circularly supplying a nutrient solution to vegetables in the thermal insulation case body 10, thereby implementing ecological vegetable preservation.

In an implementation manner, the nutrient solution in the nutrient solution circulation pipeline 12 may flow circularly along directions indicated by arrows in FIG. 5, so that the nutrient solution is supplied to vegetables placed in the vegetable carriers 11.

Figure 6:
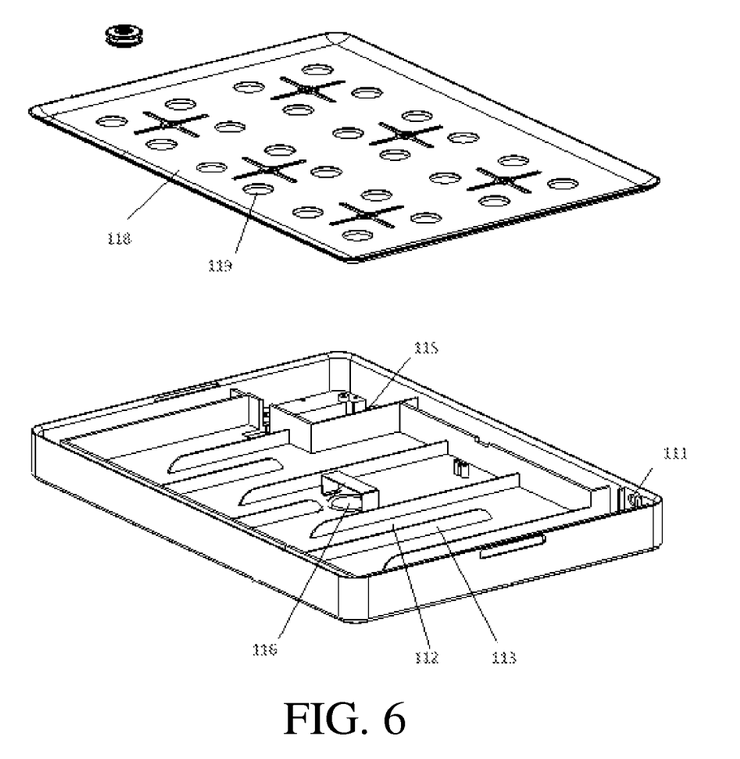
FIG. 6 is a structural diagram of an implementation manner of a vegetable carrier in a thermal insulation case body for implementing a vegetable preservation method according to an implementation manner of the present invention.

Refer to FIG. 6, which is a structural diagram of an implementation manner of a vegetable carrier 11 in a thermal insulation case body 10 for implementing a vegetable preservation method according to an implementation manner of the present invention.

As shown in FIG. 6, the vegetable carrier 11 may be provided with a high-level liquid inlet 111 and a low-level liquid outlet 115, so as to be in communication with the nutrient solution circulation pipeline 12, so that the nutrient solution from the nutrient solution circulation pipeline 12 flows back to the nutrient solution circulation pipeline through the vegetable carrier 11 under the action of gravity. The nutrient solution flows under the action of gravity, which can save energy, thereby saving power consumption of the thermal insulation case body. The high-level liquid inlet 111 and the low-level liquid outlet 115 may be provided on a same side wall of the vegetable carrier 11.

As shown in FIG. 6, by using a zigzag flow passage 112 formed by protruding diversion partitions 113 in an area, which is between the high-level liquid inlet 111 and the low-level liquid outlet 115, of the vegetable carrier 11, the nutrient solution that flows into the vegetable carrier 11 flows, in the vegetable carrier 11, to the low-level liquid outlet 115 through the zigzag flow passage 112 in a diffusion manner. By means of diversion of the flow passage 112, the nutrient solution can flow more uniformly, so that nutrients are provided, in a more desirable manner, to all vegetables placed in the vegetable carrier 11.

As shown in FIG. 6, an atomizer 116 may be further disposed in the vegetable carrier 11, so as to perform atomization processing on the nutrient solution that flows into the vegetable carrier 11. The atomized nutrient solution is sprayed to the vegetable in the vegetable carrier 11, so that the vegetable can absorb the nutrient solution more efficiently; after being atomized, the nutrient solution is sprayed in a more uniform manner, and usage of the nutrient solution is reduced. In an implementation manner, the atomizer 11 may be disposed, for example, in a central area at the bottom of the vegetable carrier 11.

As shown in FIG. 6, a vegetable shelf 118 provided with through holes 119 may be further disposed at an upper portion of the vegetable carrier 11. A vegetable to be preserved is inserted into the through hole 119, and the root of the vegetable inserted into the through hole 119 is overhead a liquid level of the nutrient solution in the vegetable carrier 11. In this way, the atomized nutrient solution may be sprayed to the root of the vegetable by using the atomizer 116.

To regulate illumination in the thermal insulation case body 10, illumination provided for the vegetable in the thermal insulation case body may be regulated to be in a direction from top to bottom.

For example, a first illumination component disposed at the bottom of an upper vegetable carrier 11 may be used to regulate illumination provided for a vegetable carried in a lower vegetable carrier 11. First illumination components at the bottom of different vegetable carriers 11 may be controlled separately, to meet illumination required for preservation of different vegetables.

In addition, a second illumination component disposed on an inner wall at the top of the thermal insulation case body 10 may be regulated, to regulate illumination provided for a vegetable carried in a first-layer vegetable carrier 11.

As a preferable solution, the vegetable preservation method may further include: establishing a pluggable electric connection between the thermal insulation case body 10 and the vegetable carrier 11.

For example, it may be detected whether the vegetable carrier 11 and the thermal insulation case body 10 are electrically connected; if the vegetable carrier 11 and the thermal insulation case body 10 are electrically connected, a flow passage for the nutrient solution from the nutrient solution circulation pipeline to the corresponding vegetable carrier 11 is turned on; otherwise, the flow passage is cut off. In this way, leakage of the nutrient solution can be prevented, thereby keeping the thermal insulation case body 10 clean.

In the vegetable preservation method according to the present invention, a nutrient solution is circularly supplied to a vegetable, and temperature, humidity and/or illumination in the thermal insulation case body is regulated, to control a growth state of the vegetable, so that the vegetable thermal insulation case body stays in a growth-retarded state or a slow growth state, thereby ensuring the freshness of the vegetable as far as possible, and extending a preservation time.

Some implementation manners of the present invention are described in detail above. As can be understood by those of ordinary skill in the art, all or any of steps or components of the method and apparatus of the present invention may be implemented as hardware, firmware, software or a combination thereof in any computing device, including processors, storage medium and the like, or network of computing devices, and can be implemented by those of ordinary skill in the art by using their basis programming skills after understanding the content of the present invention, and thus will not be described in detail.

In the device and method of the present invention, apparently, various components or steps may be split, combined and/or recombined after being split. The split and/or recombination should be considered as an equivalent solution of the present invention. It should also be pointed out that the steps for performing the above series of processing may be naturally performed chronologically in an order described herein, but they are unnecessarily to be performed chronologically. Some steps may be performed in parallel or independently from each other. In addition, in the above description of the embodiments, features described and/or shown with respect to one embodiment may be used in one or more other embodiments in a similar or same manner, or may be combined with features of other embodiments, or may be used to replace features of other embodiments.

It should be stressed that the term "comprise/include", when used in this specification, specifies the presence of stated features, elements, steps, or components, but do not preclude the presence or addition of one or more other features, elements, steps, or components.

Although the present invention and its advantages have been described in detail, it should be understood that various changes, substitutions and alterations can be made herein without departing from the spirit and scope of the present invention as defined by the appended claims. Moreover, the scope of the present invention is not intended to be limited to the particular embodiments of the process, devices, means, methods and steps described in the specification. As those of ordinary skilled in the art will readily appreciate from the disclosure of the present invention, processes, devices, means, methods, or steps, presently existing or later to be developed that perform substantially the same function or achieve substantially the same result as the corresponding embodiments described herein may be utilized according to the present invention. Accordingly, the appended claims are intended to include within their scope such processes, devices, means, methods, or steps.

While there has been shown several and alternate embodiments of the present invention, it is to be understood that certain changes can be made as would be known to one skilled in the art without departing from the underlying scope of the present invention as is discussed and set forth above and below including claims. Furthermore, the embodiments described above and claims set forth below are only intended to illustrate the principles of the present invention and are not intended to limit the scope of the present invention to the disclosed elements.

What is claimed is:

1. A vegetable preservation and growing case, comprising:
    a thermal insulation case body;
    an electric control component, configured to perform electric control on the thermal insulation case body;
    a control component, configured to regulate temperature, humidity and illumination in the thermal insulation case body; and
    a pipeline component, configured to circularly supply a nutrient solution to the thermal insulation case body,
    wherein at least one vegetable carrier for vegetable growing or preservation is disposed in the thermal insulation case body, and
    wherein each vegetable carrier is pluggably disposed in the thermal insulation case body, and is pluggably electrically connected to the electric control component; and when any of the vegetable carriers is pulled out of the thermal insulation case body and is electrically disconnected from the electric control component, the electric control component linkedly controls a water connection between the pipeline component and the corresponding vegetable carrier to be cut off, and
    wherein the control component comprises an illumination component configured to illuminate each vegetable carrier from a top to a bottom of each vegetable carrier, wherein the electric control component is configured to control a state of the illumination component, wherein the illumination component is disposed at a top of an internal space of the thermal insulation case body and the bottom of each vegetable carrier for illuminating a vegetable carrier thereunderneath, and wherein the illumination component comprises a light guide plate electrically connected to the electric control component and disposed above each vegetable carrier.

2. The vegetable preservation and growing case according to claim 1, wherein multiple vegetable carriers are disposed in the thermal insulation case body, and the multiple carriers are disposed in parallel at intervals from top to bottom.

3. The vegetable preservation and growing case according to claim 1, wherein each vegetable carrier is provided with an atomizer for atomizing the nutrient solution, and the electric control component is configured to control a state of the atomizer.

4. The vegetable preservation and growing case according to claim 1, wherein the pipeline component comprises: an upper container, a lower container, and a liquid circulation pipeline that connects the upper container and the lower container, and the liquid circulation pipeline is provided with at least two through holes at intervals from top to bottom, and is in communication with at least two corresponding vegetable carriers through the through holes.

5. The vegetable preservation and growing case according to claim 4, wherein the liquid circulation pipeline is in communication with each vegetable carrier through a pluggable joint.

6. The vegetable preservation and growing case according to claim 1, wherein the control component comprises a heat pump system, and the electric control component is configured to control the heat pump system.

7. The vegetable preservation and growing case according to claim 1, wherein a temperature sensor for sending a temperature sensing signal to the electric control component and/or a humidity sensor for sending a humidity sensing signal to the electric control component is further disposed in the thermal insulation case body.

8. The vegetable preservation and growing case according to claim 4, wherein the pipeline component further comprise a liquid pump for pumping the nutrient solution in the lower container to the upper container.

* * * * *